United States Patent [19]

Beeck et al.

[11] 4,158,771

[45] Jun. 19, 1979

[54] ION FILTER AND METHOD OF MAKING THE SAME

[75] Inventors: Udo Beeck, Erftstadt; Andreas Kluge, Cologne, both of Fed. Rep. of Germany

[73] Assignee: Leybold-Heraeus GmbH & Co. KG, Cologne, Fed. Rep. of Germany

[21] Appl. No.: 804,359

[22] Filed: Jun. 7, 1977

[30] Foreign Application Priority Data

Jun. 8, 1976 [DE] Fed. Rep. of Germany ....... 2625660

[51] Int. Cl.[2] ........................................ B01D 59/44

[52] U.S. Cl. ................................ 250/294; 250/281

[58] Field of Search ............... 250/396, 294, 295, 292, 250/281

[56] References Cited

U.S. PATENT DOCUMENTS

| | | | |
|---|---|---|---|
| 2,520,813 | 8/1950 | Rudenberg | 250/396 |
| 3,553,451 | 1/1971 | Uthe | 250/292 |
| 3,757,115 | 9/1973 | Ball | 250/292 |

*Primary Examiner*—Harold A. Dixon

*Attorney, Agent, or Firm*—Spencer & Kaye

[57] ABSTRACT

A method of making an ion filter having an electrically insulating body formed of at least two longitudinal parts and having metallized inner faces of generally hyperbolic cross-sectional shape, comprises the following steps:

(a) making longitudinal body segments constituting the longitudinal parts;

(b) grinding the longitudinal body segments to the predetermined cross-sectional shape;

(c) metallizing those ground surface portions of each longitudinal body segment that are to serve in the ion filter as inner electrode faces for generating electric fields of predetermined configuration; and (d) securing, subsequent to the metallizing step, the longitudinal body segments to one another.

9 Claims, 5 Drawing Figures

FIG.1
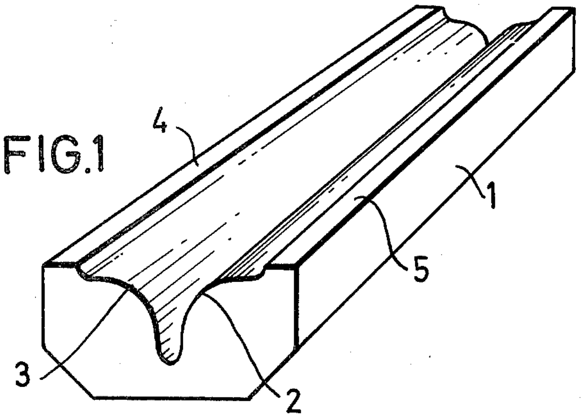
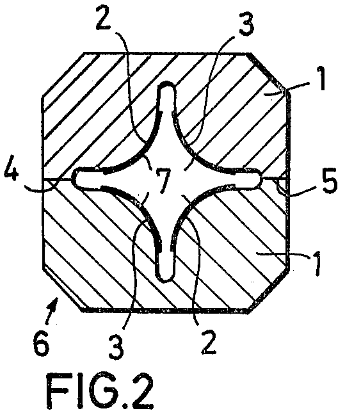
FIG.2
FIG.3
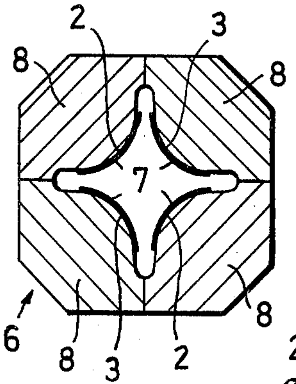
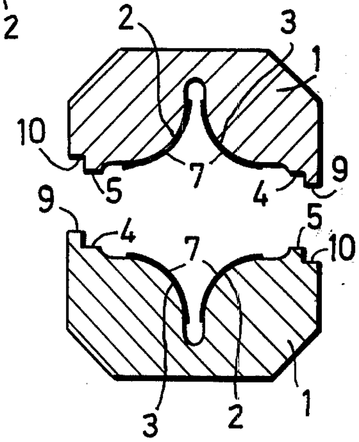
FIG.4
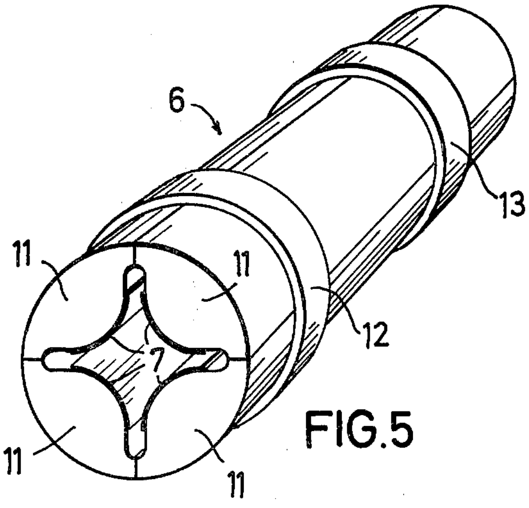
FIG.5

ION FILTER AND METHOD OF MAKING THE SAME

BACKGROUND OF THE INVENTION

This invention relates to a method of making an ion filter of an electrically insulating material such as glass, ceramic or the like which has metallized surfaces of approximately hyperbolic cross-sectional shape for generating the necessary electric fields in an ion filter. The invention further relates to an ion filter made with the method.

German Pat. No. 944,900 discloses the making of a four-pole ion filter from four metal elements such as metal sheet members or metal rods. It is a disadvantage of the manufacturing method disclosed in this German patent that an adjustment of four individual elements, the relative position of which has to be extremely precise particularly as concerns their parallelism, involves substantial difficulties. Particularly as a result of the high temperature differences (up to 450° C.) appearing during the heating of a mass analyzer, the metal components often undergo deformations because of their relatively high coefficient of expansion. Consequently, the generation of electric fields having a configuration sufficiently exact for mass analysis is no longer possible after such deformations have occurred.

Because of the above-outlined disadvantages, more recently ion filters have been provided which are formed of four ceramic rods of circular cross section and carrying a metal coating thereon. In this connection reference is made to British Pat. No. 1,263,762, as well as U.S. Pat. Nos. 3,197,633 and 3,553,451. Here too, the rods, according to these methods, have to be arranged in a precise relationship with respect to one another in a circumstantial and thus expensive manner involving, for example, ceramic holder arrangements. Particularly, because of the expensive adjusting steps, assembling the ion filter is still wrought with difficulties and involves substantial expense.

In order to overcome the difficulties experienced during the assembly of the ion filters and to obtain an ion filter which operates well even under high temperatures, it has been further proposed to manufacture the ion filter as a single body made of ceramic, glass or similar material. Thus, German Pat. No. 1,297,360 discloses the application of glass on a core body. In German Laid-Open Application (Offenlegungsschrift) No. 1,773,194 it is disclosed to provide a cylindrical ceramic body havng, in its interior, electrically conducting layers for generating the required electric fields. Further, German Laid-Open Application (Offenlegungsschrift) No. 2,215,763 teaches the making of a one-piece ion filter by extruding a ceramic body which is subsequently pressed and fired, and then the inner faces of the body are metallized.

The significant disadvantage of the above-outlined manufacturing methods resides in the fact that the surfaces to be metallized are located in the interior of a generally tubular body and are therefore accessible only with difficulty. Both the forming of the surfaces as well as their metallization is therefore difficult to perform and, as a result, irregularities in the surfaces cannot be avoided. This then leads to non-uniform electric fields. The length of the ion filters manufactured in the above-outlined manner is thus limited; this is disadvantageous, particularly for high-energy ions. It is possible, to be sure, to arrange two or more ion filters in series; this, however, again involves the above-described disadvantages regarding the expensive adjustment steps. In the method disclosed in German Laid-Open Application (Offenlegungsschrift) No. 2,215,763 the length of the ion filter is further limited in view of the particular manner in which the filter is manufactured. The hyperbolic inner faces of the ion filters obtained by extruding a soft ceramic mass must retain their exact form during the firing step as well; the longer the ceramic body, the more difficult it is to meet this requirement. In an ion filter manufactured in this manner, because of the relatively narrow axial passage and the complicated hyperbolic form of the inner faces, a post-treatment of these surfaces to ensure satisfactory surface properties is possible only —if at all—with prohibitive cost. Further, a uniform metallization of these surfaces also involves significant difficulties.

SUMMARY OF THE INVENTION

It is an object of the invention to provide an improved method for making an ion filter for a mass anaylzer, formed of an electrically insulating material such as glass, ceramic or the like which has metallized inner faces of approximately hyperbolic cross-sectional shape for the generation of the required electric fields in the interior of the ion filter, wherein an precise forming of the inner surfaces, a post-treatment and a metallization thereof is feasible in a simpler manner than it has been possible heretofore. It is a further object to provide an improved method with which it is possible to make ion filters of substantially greater length than heretofore.

These objects and others to become apparent as the specification progresses, are accomplished by the invention, according to which, briefly stated, the method of making an ion filter having an electrically insulating body formed of at least two longitudinal parts and having metallized inner faces of generally hyperbolic cross-sectional shape, comprises the following steps:

(a) making longitudinal body segments constituting the longitudinal parts;

(b) grinding the longitudinal body segments to the predetermined cross-sectional shape;

(c) metallizing those ground surface portions of each longitudinal body segment that are to serve in the ion filter as inner electrode faces for generating electric fields of predetermined configuration; and (d) securing, subsequent to the metallizing step, the longitudinal body segments to one another.

With the above method an ion filter is obtained which, regarding deformation, exhibits all the advantages of the one-piece ion filters known heretofore. By performing the treatment of the surfaces and their metallization on the individual longitudinal body segments of the filter, the surfaces are freely accessible so that no difficulties are encountered regarding a precise forming and uniform metallization thereof. Further, the ion filters may be of substantially greater length than it was possible heretofore.

Expediently, the longitudinal segments are of identical configuration which facilitates the manufacturing process.

According to a further advantageous feature of the invention, those faces of the individual longitudinal body segments which are to be arranged in a face-to-face relationship as the segments are joined to one another, are provided with complemental, interfitting ribs and grooves. These ribs and grooves may be manufactured with the same precision as the other surfaces so that an accurate alignment of the longitudinal segments may be effected in a simple manner without the need to perform adjusting steps.

According to a preferred embodiment of the invention, the ion filter obtained with the above method is expediently formed of at least two longitudinal segments secured to one another, for example, by gluing, cementing or by means of external braces.

BRIEF DESCRIPTION OF THE DRAWINGS

FIG. 1 is a perspective view of one longitudinal body segment of a two-segment ion filter according to the invention.

FIG. 2 is a cross-sectional view of an assembled two-segment ion filter according to the invention.

FIG. 3 is a cross-sectional view of an assembled four-segment ion filter according to the invention.

FIG. 4 is an exploded cross-sectional view of another embodiment of a two-segment ion filter according to the invention.

FIG. 5 is a perspective view of a further embodiment of an assembled four-segment ion filter.

DESCRIPTION OF THE PREFERRED EMBODIMENTS

Turning now to FIG. 1, there is illustrated a longitudinal body segment 1 for a two-part, four-pole ion filter. The hyperbolic faces 2 and 3 are provided in the body segment 1 by means of a high-precision grinding operation. It is seen that the surfaces 2 and 3 are freely accessible both for the grinding operation and the subsequent metallizing step. Surfaces 4 and 5 are contact faces which, when two body segments 1 of the configuration shown in FIG. 1 are joined as shown in FIG. 2, assume a face-to-face contacting (abutting) relationship and may be bonded to one another by gluing or cementing. The metal layers applied to surfaces 2 and 3 prior to assembling the body segments to provide electrode faces which generate and shape the electric field in the ion filter, are designated at 7 in FIG. 2.

FIG. 3 illustrates in cross section an ion filter made according to the invention and consisting of four longitudinal body segments 8. Other features of this embodiments correspond to those shown in the structure illustrated in FIGS. 1 and 2.

Turning now to FIG. 4, the contact face 4 along one side of each body segment has a projection (lug or rib) 9, whereas the contact face 5 along the other side of each body segment has a depression (groove or shoulder) 10. It is seen in FIG. 4 that the longitudinal body segments are so oriented towards one another, that the projection 9 and the depression 10 in the one segment are aligned, respectively, with the depression 10 and the projection 9 in the other segment. In this manner, as the contact faces 4, 5 assume their face-to-face contacting relationship, the cooperating projections and depressions interengage in a conforming, form-fitting manner to thus constitute an alignment means positively determining the positional relationship between the longitudinal body segments. The interengaging components 9 and 10 may be either continuous or may be formed of discrete, spaced elements constituting longitudinally extending series. By virtue of the interengaging (interlocking) components 9 and 10 a joining of the longitudinal filter segments in the required precise manner is particularly simple.

FIG. 5 illustrates an ion filter 6 having a cylindrical configuration. The ion filter in this embodiment is formed of four longitudinal body segments 11 which are braced together by means of rings 12 and 13 shrunk on the cylinder body.

While the exemplary embodiments of the invention described above are four-pole ion filters, it is feasible to manufacture ion filters of different pole number with the method according to the invention.

It is to be understood that the above description of the present invention is susceptible to various modifications, changes and adaptations, and the same are intended to be comprehended within the meaning and range of equivalents of the appended claims.

What is claimed is:

1. A method of making an ion filter having an electrically insulating body formed of at least two longitudinal parts and having metallized inner faces of generally hyperbolic cross-sectional shape; comprising the following steps:
   (a) making longitudinal body segments constituting said longitudinal parts;
   (b) grinding the longitudinal body segments to the predetermined cross-sectional shape;
   (c) metalllzing those ground surface portions of each longitudinal body segment that are to serve in the ion filter as inner electrode faces for generating electric fields of predetermined configuration; and
   (d) shrinking bracing rings onto the outer circumference of the assembled longitudinal body segments subsequent to the metallizing step for securing said longitudinal body segments to one another.

2. A method as defined in claim 1, wherein step (a) comprises making identical longitudinal body segments.

3. A method of making an ion filter having an electrically insulating body formed of at least two longitudinal parts and having metallized inner faces of generally hyperbolic cross-sectional shape; comprising the following steps:
   (a) making longitudinal body segments constituting said longitudinal parts;
   (b) providing, on surface portions of said longitudinal body segments to be arranged in a face-to-face contacting relationship, complemental projections and depressions;
   (c) grinding the longitudinal body segments to the predetermined cross-sectional shape;
   (d) metallizing those ground surface portions of each longitudinal body segment that are to serve in the ion filter as inner electrode faces for generating electric fields of predetermined configuration;
   (e) subsequent to the metallizing step, positioning said segments on one another in a mutually contacting relationship in which surface portions of said segments are in an abutting, face-to-face engagement; and
   (f) securing said contacting longitudinal body segments to one another subsequent to the metallizing step.

4. A method as defined in claim 3, wherein the securing step includes the step of bonding to one another mutually contacting surface portions of said longitudinal body segments.

5. A method as defined in claim 3, wherein step (a) comprises making identical longitudinal body segments.

6. In an ion filter having an electrically insulating elongated body having a passage extending through the interior of said body along the length dimension thereof; the passage being defined by internal walls having generally a cross-sectional hyperbolic shape and having metallized portions constituting electrode faces; the improvement comprising a plurality of longitudinal segments being in an abutting, face-to-face contact with one another along respective surface portions; said longitudinal segments together constituting said body; securing means for holding said longitudinal segments together; and projection means provided on the one surface portion and depression means provided on the other surface portion; said projection means and said depression means being in a form-fitting interengagement with one another and together constituting an alignment means for determining the positional relationship between the contacting longitudinal body segments.

7. An ion filter as defined in claim 6, wherein said securing means includes ring means circumferentially surrounding and engaging said body.

8. An ion filter as defined in claim 6, wherein said projection means comprises a rib extending along the length of said body and said depression means comprises a groove extending along the length of said body.

9. In an ion filter having an electrically insulating elongated body having a passage extending through the interior of said body along the length dimension thereof; the passage being defined by internal walls having generally a cross-sectional hyperbolic shape and having metallized portions constituting electrode faces; the improvement comprising a plurality of longitudinal segments being in an abutting, face-to-face contact with one another along respective surface portions; said longitudinal segments together constituting said body; and an adhesive bonding the contacting surface portions to one another for securing said longitudinal segments together.

* * * * *